(12) United States Patent
Sakamoto et al.

(10) Patent No.: US 8,005,362 B2
(45) Date of Patent: Aug. 23, 2011

(54) PASSIVE OPTICAL NETWORK SYSTEM AND OPTICAL LINE TERMINAL

(75) Inventors: Norihiro Sakamoto, Yokohama (JP); Yusuke Yajima, Fujisawa (JP); Tohru Kazawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 751 days.

(21) Appl. No.: 12/022,172

(22) Filed: Jan. 30, 2008

(65) Prior Publication Data

US 2009/0034973 A1 Feb. 5, 2009

(30) Foreign Application Priority Data

Aug. 3, 2007 (JP) ................................. 2007-203298

(51) Int. Cl.
*H04J 14/00* (2006.01)
(52) U.S. Cl. ......................................................... 398/67
(58) Field of Classification Search ................... 398/208
See application file for complete search history.

(56) References Cited

U.S. PATENT DOCUMENTS 6,359,941 B1 * 3/2002 den Bakker ................... 375/317
6,785,344 B1 * 8/2004 Jiang et al. .................... 375/317

FOREIGN PATENT DOCUMENTS

JP 2007-36920 2/2007

OTHER PUBLICATIONS

ITU-T G.984.1, International Telecommunication Union, Series G: Transmission Systems and Media Digital System and Networks, Mar. 2003.
ITU-T G.984.2, International Telecommunication Union, Series G: Transmission Systems and Media Digital System and Networks, Mar. 2003.
ITU-T G.984.3, International Telecommunication Union, Series G: Transmission Systems and Media Digital System and Networks, Feb. 2004.

\* cited by examiner

*Primary Examiner* — Shi K Li

(74) *Attorney, Agent, or Firm* — Antonelli, Terry, Stout & Kraus, LLP.

(57) ABSTRACT

In order to be able to moderate the inclination of the PON burst reception characteristics and to improve the FEC effect, a first offset is used in a ranging window field, and a second offset, which is lower than the first offset value, is used in a burst data field other than the ranging window field.

3 Claims, 15 Drawing Sheets

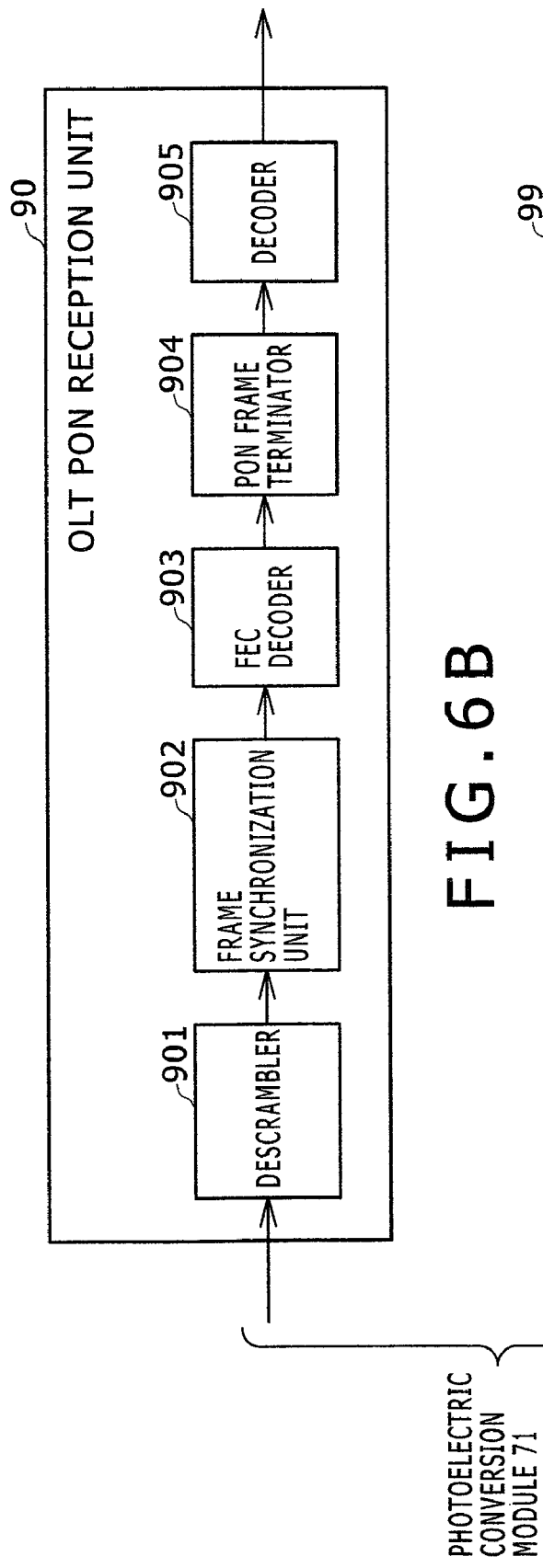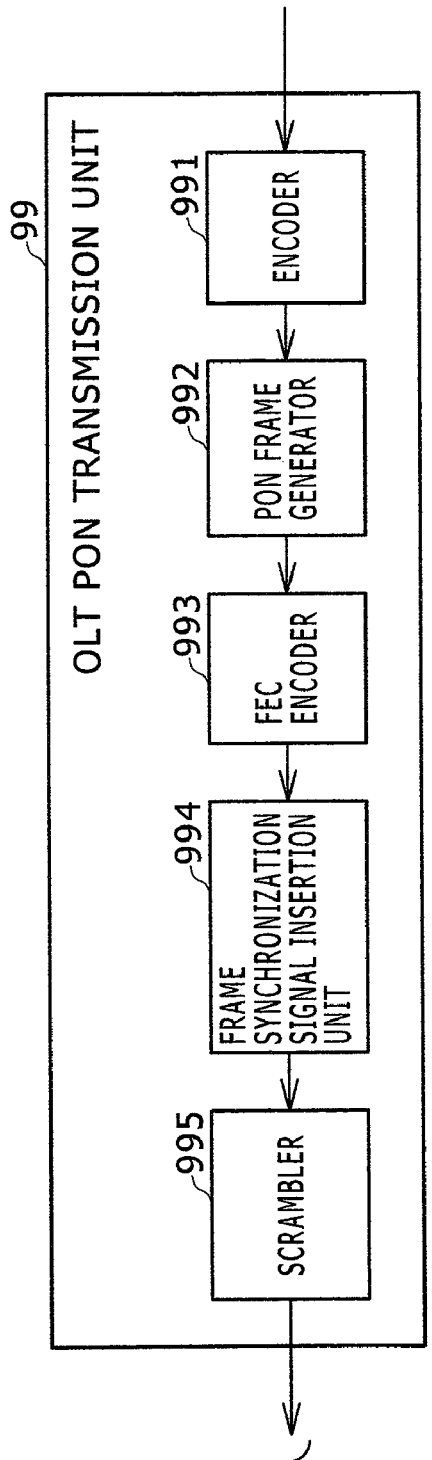
FIG. 6A / FIG. 6B

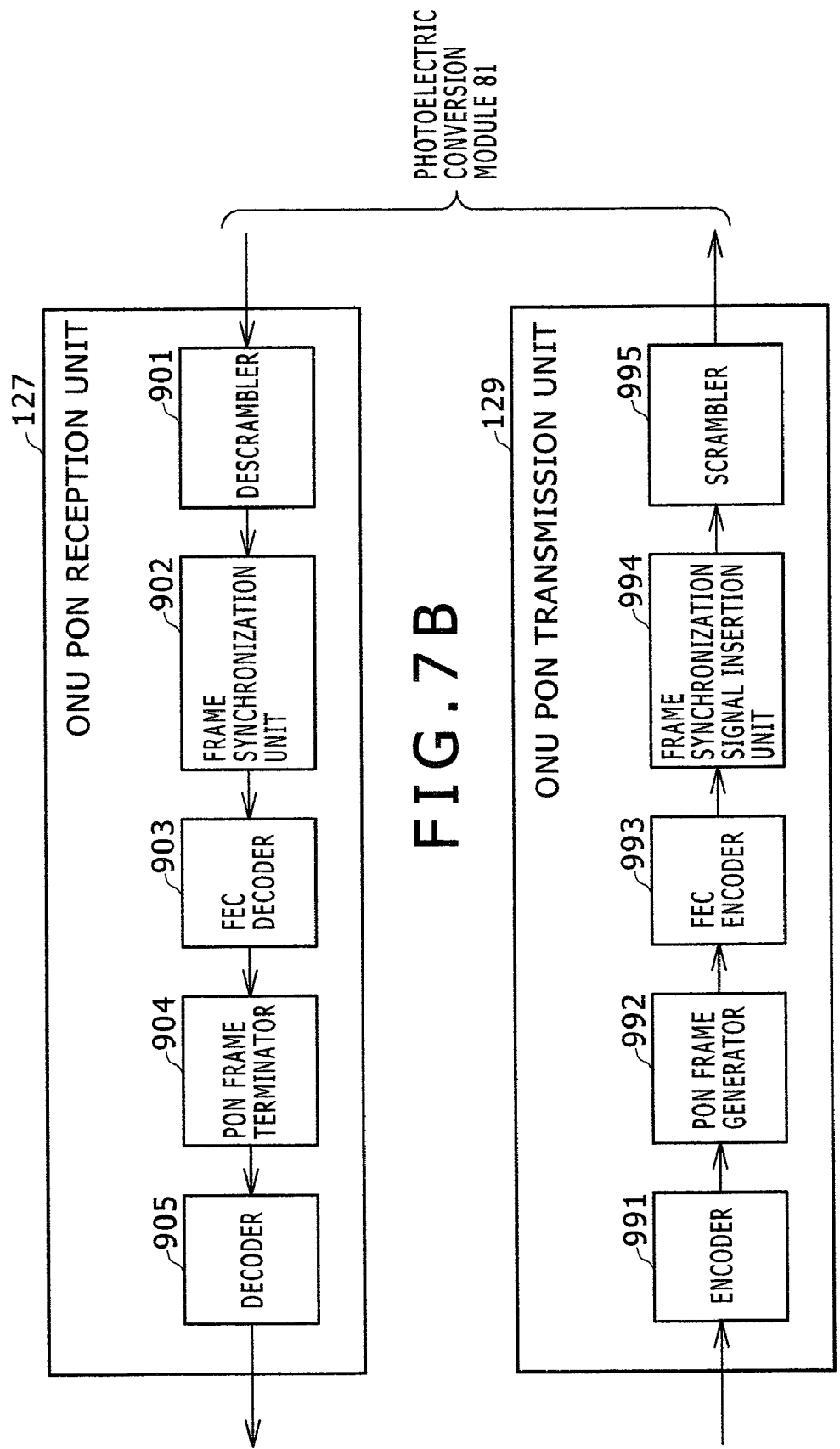

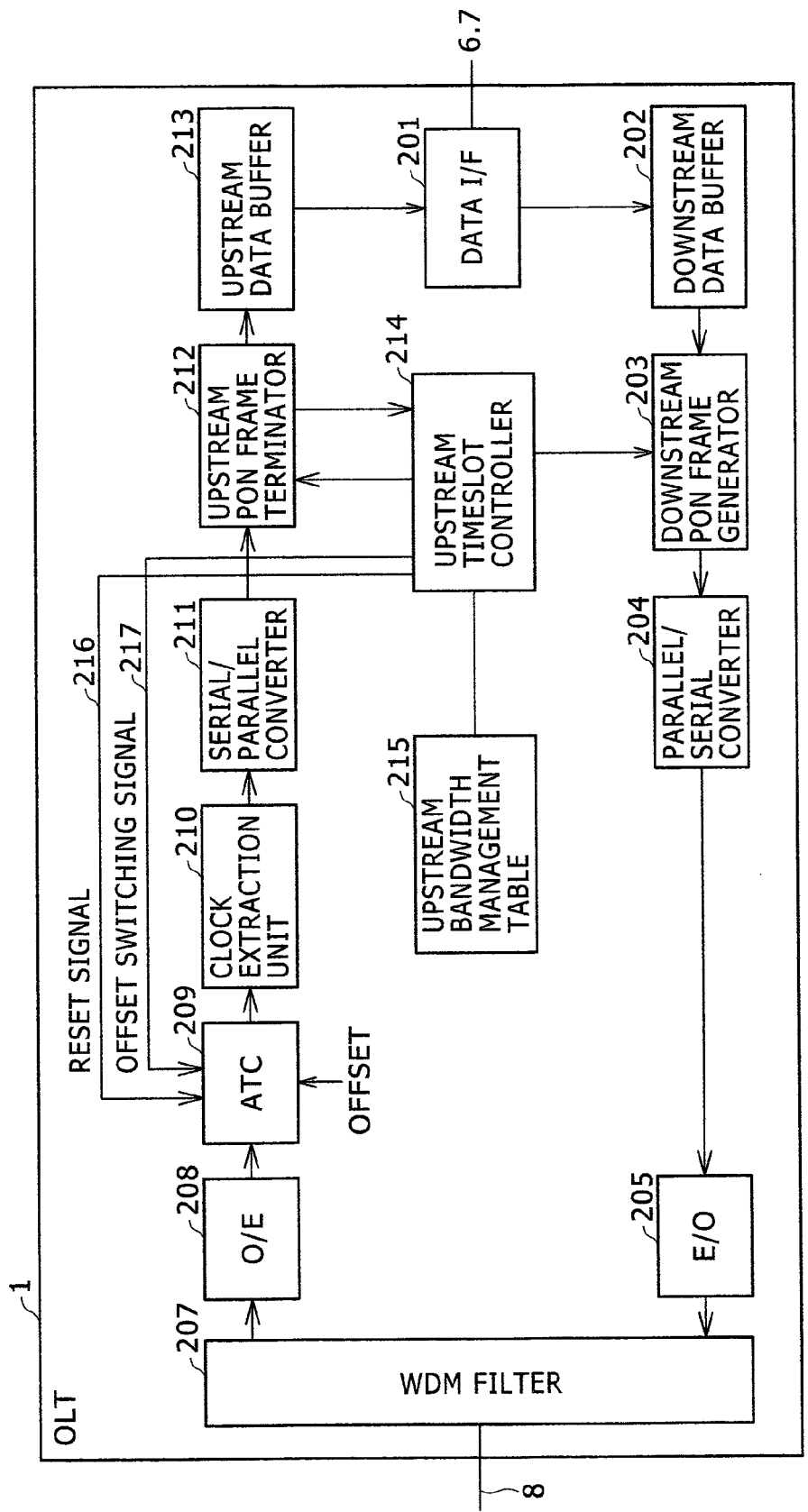

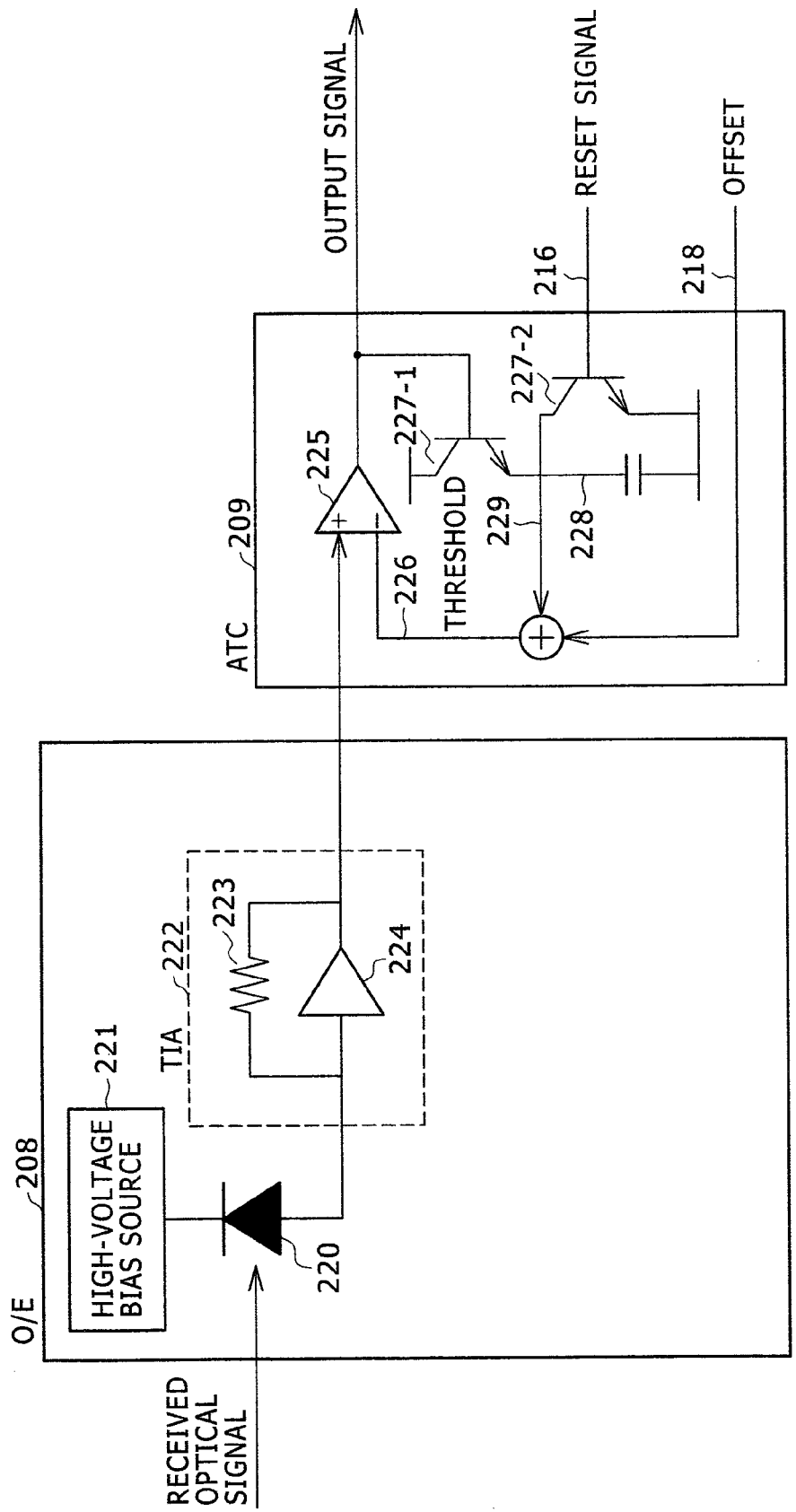

PASSIVE OPTICAL NETWORK SYSTEM AND OPTICAL LINE TERMINAL

CLAIM OF PRIORITY

The present application claims priority from Japanese patent application serial no. 2007-203298, filed on Aug. 3, 2007, the content of which is hereby incorporated by reference into this application.

BACKGROUND OF THE INVENTION

The present invention relates to a Passive Optical Network (PON) system in which plural subscriber connection apparatuses share an optical transmission line, and an optical line terminal (OLT). More particularly, the present invention relates to a PON system and an OLT, in which the inclination of burst reception characteristics is moderate.

A PON system includes an OLT and plural Optical Network Units (ONUs). Each ONU converts an electrical signal from a terminal (such as PC) connected to the ONU into an optical signal. The individual ONUs transmit optical signals to the OLT through their subscriber optical fibers and an optical splitter. At this time, the optical signals are time-division multiplexed on the trunk fiber to the OLT. The OLT provides communication between a terminal of an ONU, and a terminal of a different ONU or a terminal of a different network (NW).

As specified in Sections 8 and 9 of ITU-T Recommendation G984.1, each ONU is located in one of the following three ranges: 0 to 20 km, 20 km to 40 km, and 40 km to 60 km in length of the optical fiber. However, the transmission distances of the nearest ONU and the farthest ONU differ as much as 20 km, and the transmission delays differ therebetween, so that the optical signals output from the ONUs may collide and interfere with each other. For this reason, the delays of the output signals from the ONUs are adjusted as if all the ONUs are located at an equal distance (such as 20 km) by the ranging technology specified in Section 10 of ITU-T Recommendation G.984.3. As a result, the optical signals from the ONUs do not interfere on the trunk fiber. Incidentally, the PON system can adjust the interference, but cannot adjust the attenuation due to the difference of the length of the optical fiber.

Further, as specified in Section 8.3.3 of ITU-T Recommendation G.984.2, a guard time, a preamble, and a delimiter are added to the head of the signal from the ONU. The guard time has 12 bytes and serves as a protection against the interference. The preamble is used for determination of the identification threshold of a receiver, as well as for clock extraction. The demiliter is used for identifying the boundary of the received signal.

In Section 8.2 of ITU-T Recommendation G.984.3, signals transmitted from plural ONUs to an OLT are referred to as upstream signals. The upstream signal includes a preamble, a delimiter, and a payload signal. Further, as shown in FIG. 8-2 of Section 8 of the recommendation, a guard time is provided immediately before each upstream signal in order to avoid collision with the last bust signal.

On the other hand, according to Section 8.1 of the recommendation, signals transmitted from the OLT to the plural ONUs are referred to as downstream signals. The downstream signal includes a frame synchronization pattern, a PLOAM field, a US Bandwidth MAP field, and a frame payload. As shown in Section 8.1.3.6 of the recommendation, the OLT specifies the timing of the upstream transmission permission for each ONU by use of the field called US Bandwidth MAP. The US Bandwidth MAP field includes a start value for specifying the start of the transmission permission, and an end value for specifying the end of the transmission permission, respectively on a per-byte basis. The values are also referred to as grant values, meaning that the transmission is permitted. The difference between the end value and the next start value is an upstream no-signal field corresponding to the guard time. Incidentally, it is possible to allocate plural bandwidth allocation units called T-CONTs to each ONU. The upstream transmission permission timing is specified for each T-CONT.

Ranging is performed in such a way that the OLT requests the ONU to transmit a distance measurement signal. The ONU returns a distance measurement frame to the OLT. Upon receiving the signal, the OLT measures the time period from the transmission request of the distance measurement signal to the reception of the distance measurement signal, namely, the OLT measures the round-trip delay time to discover how far the ONU is from the OLT. Next, the OLT transmits a message to each ONU to delay its transmission by a time called equalization delay so that all the ONUs appear to be located at an equal distance from the OLT. For example, the OLT specifies, for each ONU, an equalization delay that is equal to "(20 km round-trip delay time)-(measured round-trip delay time)" so that all the ONUs have the 20 km round-trip delay time. The ONU has a circuit for transmitting data with a delay fixed to the specified equalization delay. The above specification ensures that all the ONUs have the round-trip delay time of 20 km for the upstream data transmission.

In JP-A No. 2007-036920, there is a detailed description on the ranging in the PON system described above.

In such a PON burst receiving circuit, an offset is added to a threshold for determining "1" or "0", in order to guard against white noise (hereinafter referred to as noise) occurring in a no signal timeslot, called a ranging window that is used for the ranging. Because the offset is added to the threshold that would have been in the middle of the peak and bottom values of the received signal, the threshold approaches the peak value by the amount of the offset. Hence, the probability of misidentifying "1-" as "0" is higher than when the offset is not used, and the inclination of the burst reception characteristics is steep. Meanwhile, ITU-T Recommendation G.984.3 specifies Forward Error Correction (FEC) technology that can correct an error rate of le-4 to an equivalent of le-12, using a Reed-Solomon code. Larger coding gain can be obtained as the inclination of the PON burst reception characteristics is moderate.

SUMMARY OF THE INVENTION

The present invention moderates the inclination of the burst reception characteristics in order to obtain larger coding gain in PON bust reception. Further, the present invention provides a PON system and an optical line terminal that have excellent burst reception characteristics.

The above can be achieved by switching between offsets, one for ranging transmission in a ranging window and the other for burst data of a timeslot other than the ranging window. A first value is used for the offset for ranging transmission, and a second value, which is lower than the first value, is used for the offset for burst data other than the ranging transmission.

Further, the above can be achieved by a PON system including: an optical line terminal; a trunk fiber connected to the optical line terminal; an optical splitter connected to the trunk fiber; and plural optical network units connected to the optical splitter through plural subscriber fibers. The optical line terminal is configured to be able to select an offset to be used to guard against noise occurring in an upstream no-signal field.

Further, the above can be achieved by an optical line terminal including: an OE converter; an identification unit for identifying the output of the OE converter; and a controller for controlling the identification unit. The controller controls in the period of receiving a ranging transmission so that the identification unit selects a first offset, and controls in the period other than a period of receiving the ranging transmission so that the identification unit selects a second offset. The identification unit calculates a threshold for identification based on the first offset or the second offset.

Still further, the above can be achieved by an optical line terminal including: an OE converter; a first identification unit for identifying the output of the OE converter by use of a first offset; a second identification unit for identifying the output of the OE converter by use of a second offset; a selector for selecting one of the first identification unit and the second identification unit; and a controller for controlling the selector. The controller selects the first identification unit in the period of receiving a ranging transmission, while selecting the second identification unit in a period other than the period of receiving the ranging transmission.

BRIEF DESCRIPTION OF THE DRAWINGS

Preferred embodiments of the present invention will now be described in conjunction with the accompanying drawings, in which:

FIGS. 6A and 6B are block diagrams of a PON reception unit and a PON transmission unit in the OLT;
FIGS. 7A and 7B are block diagrams of a PON reception unit and a PON transmission unit in the ONU;
FIG. 8 is a functional block diagram of the OLT;
FIG. 9 is a hardware block diagram of O/E and ATC that constitute an OLT optical signal reception part.

DESCRIPTION OF THE PREFERRED EMBODIMENT

Figure 1:
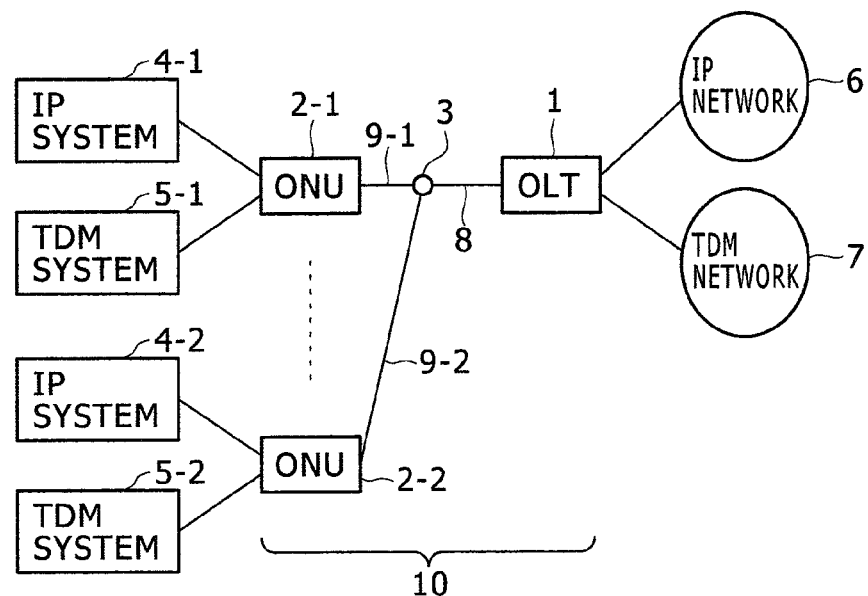
FIG. 1 is a block diagram of an optical access network.

Hereinafter, a preferred embodiment will be described by examples with reference to the drawings. Like or corresponding parts are denoted by the same reference numerals and the description will not be repeated.

FIG. 1 is a block diagram of an optical access network. An optical access network 10 includes an OLT 1, ONUs 2, a splitter 3, a trunk fiber 8 between the OLT 1 and the splitter 3, and subscriber fibers 9 between the splitter 3 and the ONUs 2. Each ONU 2 is connected to an IP system 4 and a TDM system 5. The OLT 1 is connected to an IP network 6 and a TDM network 7.

TDM signals from the TDM systems 5 are accommodated in the TDM network 7 through the optical access network 10. Signals from the IP systems 4 are accommodated in the IP network 7 through the optical access network 10. These signals are referred to as upstream signals.

On the other hand, a TDM signal from the TDM network 7 is accommodated in the TDM systems 5 through the optical access network 10. A signal from the IP network 6 is accommodated in the IP systems 4 through the optical access network 10. These signals are referred to as downstream signals.

Incidentally, in the block diagrams in the following FIGS. 2 to 11 described below, the signal flow directions (upstream and downstream directions) are the same as in FIG. 1.

Figure 2:
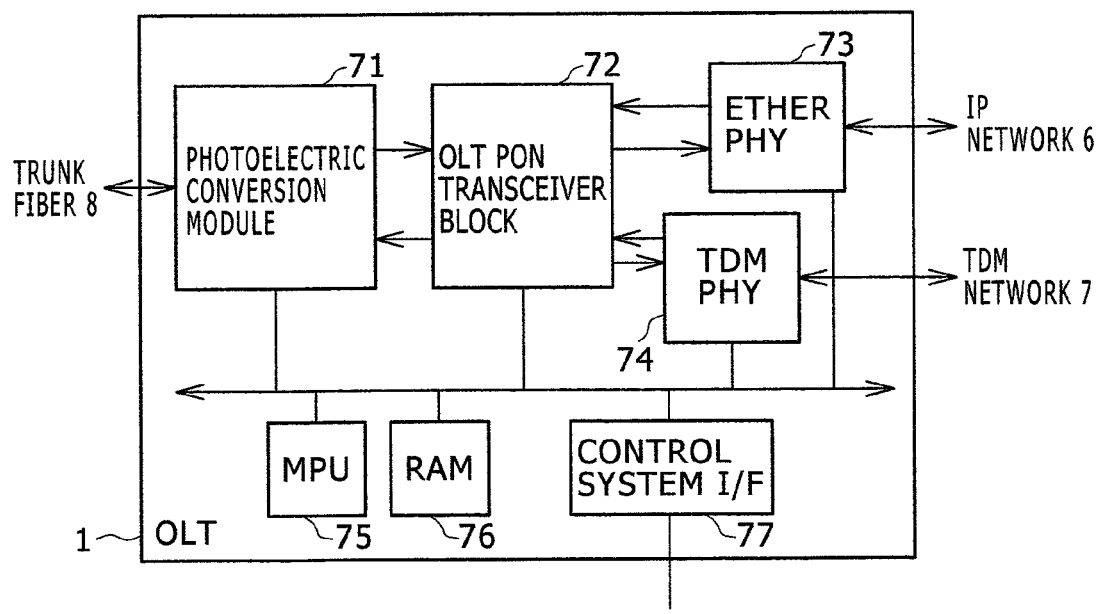
FIG. 2 is a block diagram of an OLT.

FIG. 2 is a block diagram of the OLT. An upstream optical signal from the trunk fiber 8 is converted to an electrical signal by a photoelectric conversion module 71, and is subjected to GEM termination in an OLT PON transceiver block 72. The converted electrical signal is further converted to an Ethernet frame and a TDM signal. The Ethernet frame and the TDM signal are transmitted to the IP network 6 and the TDM network 7 through an Ethernet PHY 73 and a TDM PHY 74, respectively.

Downstream signals from the IP network 6 and the TDM network 7 are received by the Ethernet PHY 73 and the TEM PHY 74, respectively, and then transmitted to the OLT PON transceiver block 72. The OLT PON transceiver block 72 performs a GEM frame assembly, and transmits to the trunk fiber 8 through the photoelectric conversion module 71. Here, MPU 75 is a microcomputer for controlling the OLT 1, RAM 76 is a random access memory, and a control system interface 77 is an interface for setting the OLT 1 from the outside.

Figure 3:
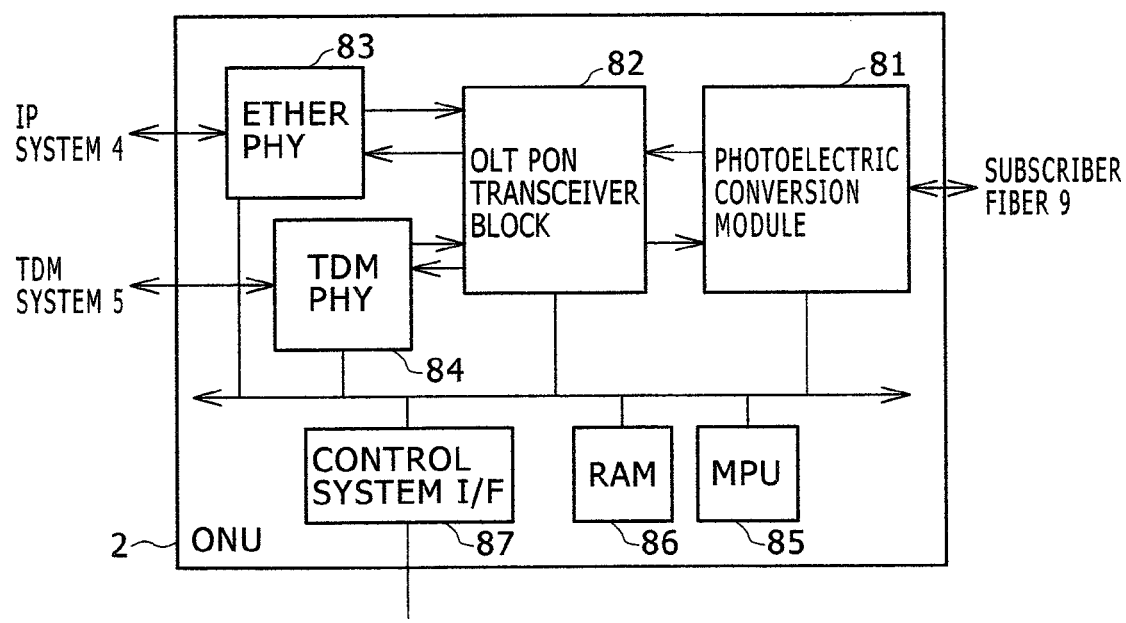
FIG. 3 is a block diagram of an ONU.

FIG. 3 is a block diagram of the ONU. The downstream signal from the subscriber fiber 9 is converted to an electrical signal by a photoelectric conversion module 81, and is subjected to GEM termination in an ONU PON transceiver block 82. The ONU PON transceiver block 82 converts the converted electrical signal into an Ethernet frame and a TDM signal. The Ethernet frame and the TDM signal are transmitted to the IP system 4 and the TDM system 5 through an Ethernet PHY 83 and a TDM PHY 84, respectively.

The upstream signals from the IP system 4 and the TDM system 5 are received in the Ethernet PHY 83 and the TDM PHY 84, respectively, and then transmitted to the ONU PON transceiver block 82. The ONU PON transceiver block 82 performs GEM frame assembly, and transmits to the subscriber fiber 9 through the photoelectric conversion module 81. Here, MPU 85 is a microcomputer for controlling the ONU 2, RAM 86 is a random access memory, and a control system interface 87 is an interface for setting the ONU 2 from the outside.

Figure 4:
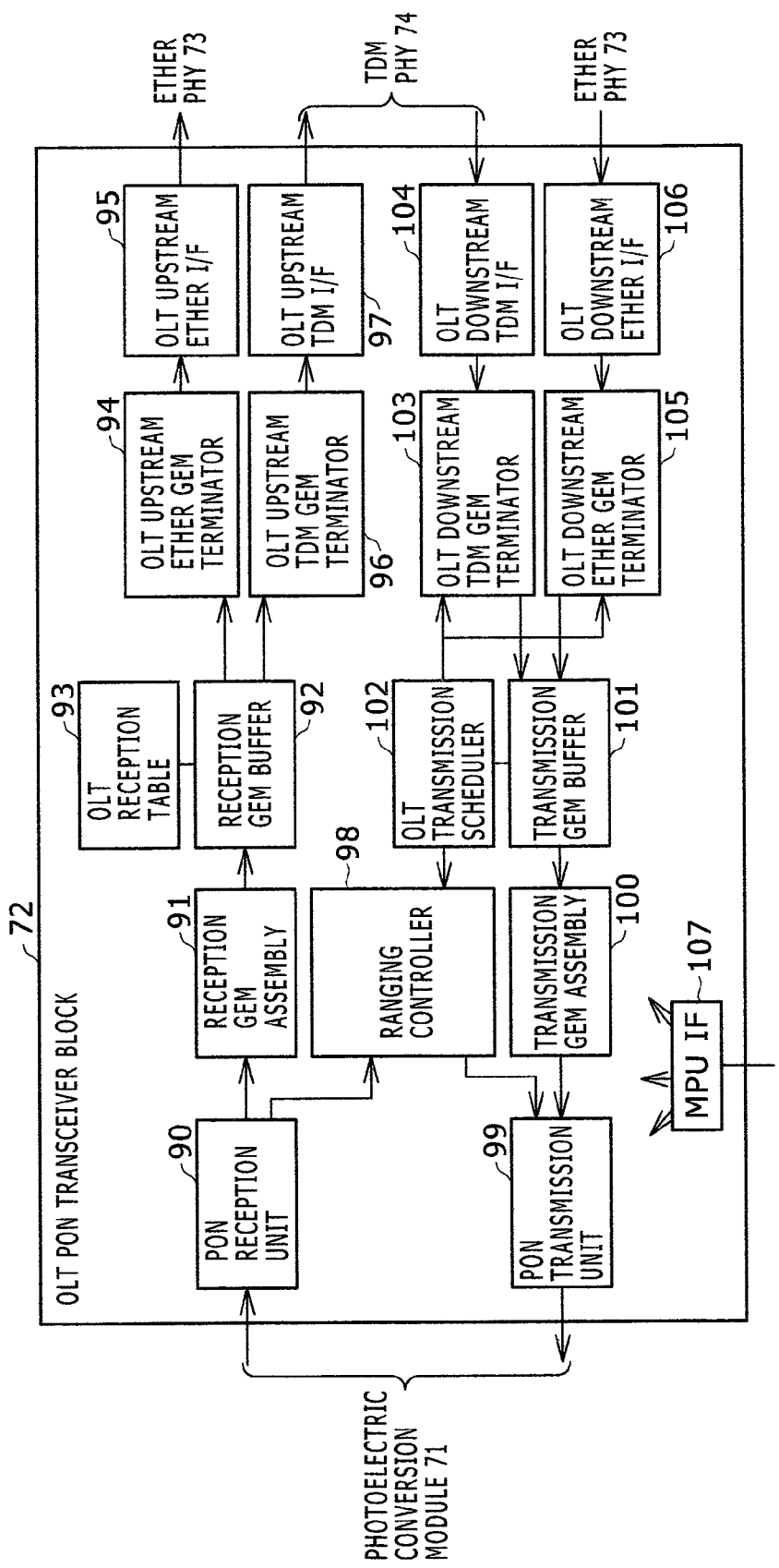
FIG. 4 is a block diagram of a PON transceiver block of the OLT.

FIG. 4 is a block diagram of the PON transceiver block of the OLT. The upstream PON frame signal from the photoelectric conversion module 71 is subjected to such processes as synchronization and GEM extraction by the PON reception unit 90. The extracted payload is transmitted to a reception GEM assembly 91. The reception GEM assembly 91 assembles the GEM that is divided into plural short frames for transmission. Then, the assembled GEM is stored in a reception GEM buffer 92, and is transmitted to either an OLT upstream Ethernet GEM terminator 94 or to an OLT upstream TDM GEM terminator 97, according to the table information of an OLT reception table 93.

The OLT upstream Ethernet GEM terminator 94 extracts an Ethernet frame from the GEM frame, and transmits the extracted Ethernet frame to the Ethernet PHY 73 through an OLT upstream Ethernet interface 95. The OLT upstream TDM GEM terminator 96 extracts a TDM signal from the GEM frame, and transmits the extracted TDM signal to the TDM PHY 74 through an OLT upstream TDM interface 97 at a desired timing.

With respect to the downstream signal, an OLT downstream TDM interface 104 receives the TDM signal from the TDM PHY 74. An OLT downstream TDM GEM terminator 103 buffers the TDM signal to generate GEM. An OLT downstream Ethernet interface 106 receives the Ethernet frame from the Ethernet PHY 73. An OLT downstream Ethernet GEM terminator 105 generates GEM. An OLT transmission scheduler 102 controls the OLT downstream TDM GEM terminator 103, and periodically transmits the GEM of the TDM to a transmission GEM buffer 101. The OLT transmission scheduler 102 also controls an OLT downstream Ethernet GEM terminator 105, and transmits the GEM of the Ethernet frame to the transmission GEM buffer 101 at an idle timing. The OLT transmission scheduler 102 controls the transmission GEM buffer 101, and periodically transmits the GEM of the TDM signal as well as the GEM of the Ethernet frame, to a transmission GEM assembly 100. The transmission GEM assembly 100 assembles the GEM for the payload of the PON frame, and transmits the assembled GEM to a PON transmission unit 99. The PON transmission unit 99 generates a header, and then transmits the PON frame.

The ranging is performed to measure the distance between the OLT 1 and the ONU 2, in such a way that a ranging controller 98 transmits a ranging signal from the PON transmission unit 99 at a timing permitted by the OLT transmission scheduler 102. When a response from the ONU 2 is returned to the ranging controller 98 through the PON reception unit 90, the ranging is completed.

Incidentally, the MPU 75 provides control to the control blocks through an MPU interface 107.

Figure 5:
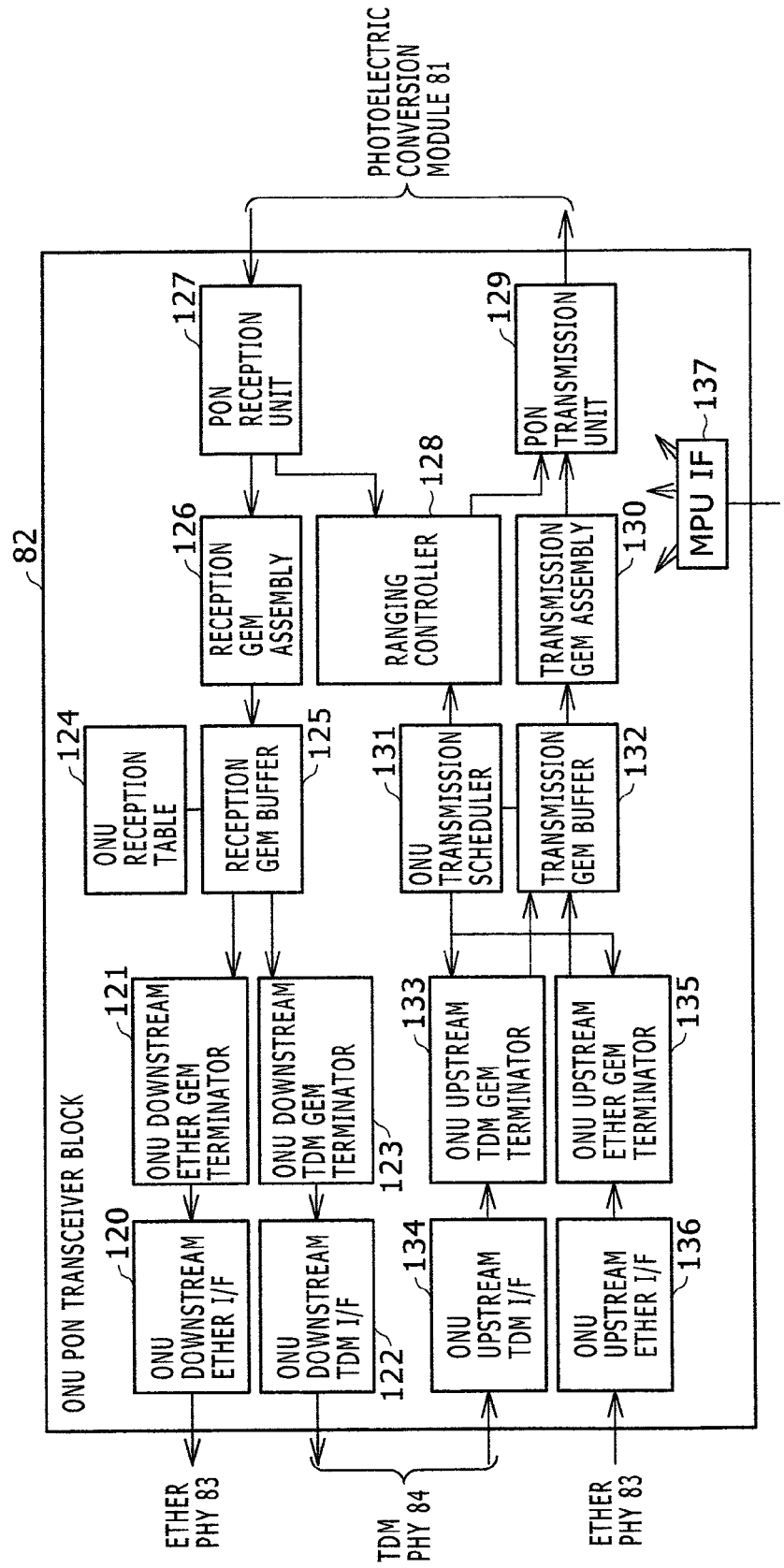
FIG. 5 is a block diagram of a PON transceiver block of the ONU.

FIG. 5 is a block diagram of the PON transceiver block of the ONU. The downstream signal from the photoelectric conversion module 81 is received by a PON reception unit 127. The PON reception unit 127 performs such processes as synchronization and GEM extraction. A reception GEM assembly 126 assembles the GEM that is divided into plural short frames for transmission. The assembled GEM is stored in a reception GEM buffer 125, and is transmitted either to an ONU downstream Ethernet GEM terminator 121 or to an ONU downstream TDM GEM terminator 123, according to the table information of an ONU reception table 124. The ONU downstream Ethernet GEM terminator 121 extracts an Ethernet frame from the GEM. The Ethernet frame is transmitted to the Ethernet PHY 83 through an Ethernet interface 120. The ONU downstream TDM GEM terminator 123 extracts a TDM signal from the GEM, and transmits the TDM signal to the TDM PHY 84 through an ONU downstream TDM interface 122 at a predetermined timing.

With respect to the upstream signal, an ONU upstream TDM interface 134 receives the TDM signal. An ONU upstream TDM GEM terminator 133 buffers the TDM signal to generate GEM. An ONU upstream Ethernet interface 136 receives the Ethernet frame. An ONU upstream Ethernet GEM terminator 135 generates GEM. An ONU transmission scheduler 131 controls the ONU upstream TDM GEM terminator 133, and periodically transmits the GEM of the TDM to a transmission GEM buffer 132. The ONU transmission scheduler 131 also controls the ONU upstream Ethernet GEM terminator 135, and transmits the GEM of the Ethernet to the transmission GEM buffer 132 at an idle timing. The ONU transmission scheduler 131 controls the transmission GEM buffer 132, and periodically transmits the GEM of the TDM as well as the GEM of the Ethernet, to a transmission GEM assembly 130. The transmission GEM assembly 130 assembles the GEM for the payload of the PON frame, and transfers the assembled GEM to a PON transmission unit 129. The PON transmission unit 129 generates a header, and then transmits the PON frame.

In the case of a ranging request, a ranging controller 128 processes a ranging signal received by the PON reception unit 127, and returns a ranging reception signal through the PON transmission unit 129.

Incidentally, the MPU 85 provides control to the control blocks through an MPU interface 137.

Returning to FIG. 1, the OLT 1 measures the distance to each of the ONUs 2-1 to 2-2, according to the ranging procedure indicated in ITU-T Recommendation G.984.3. The OLT 1 sets the equalization delay to each ONU 2 so that all the ONUs 2 appear to be located at an equal distance from the OLT 1. Because of this setting, it is possible to treat all the ONUs 2 as if they are connected, for example, at 20 km. In addition, this prevents the upstream signals from the ONUs 2 from colliding with each other on the trunk fiber 8.

FIGS. 6A and 6B are block diagrams of the PON reception unit and the PON transmission unit in the OLT. FIGS. 7A and 7B are block diagrams of the PON reception unit and the PON transmission unit in the ONU. In FIG. 6A, the OLT PON reception unit 90 includes: a descrambler 901 for releasing the scramble of the upstream signal; a frame synchronization unit 902 for performing frame synchronization of the descrambled signal; an FEC decoder 903 for separating the information word and the FEC parity to correct an error of the information word; a PON frame terminator 904; and a decoder 905 for decoding the code. In FIG. 6B, the OLT PON transmission unit 99 includes: an encoder 991 for encoding the downstream signal; a PON frame generator 992 for making the encoded data into a PON frame; an FEC encoder 993 for adding the FEC parity to the PON frame; a frame synchronization signal insertion unit 994 for inserting the frame synchronization signal; and a scrambler 995.

The ONU PON reception unit 127 of FIG. 7A has the same configuration as the OLT PON reception unit 90 of FIG. 6A, excepting the signal flow. Similarly, the ONU PON transmission unit 129 of FIG. 7B has the same configuration as the OLT PON transmission unit 99 of FIG. 6B, excepting the signal flow. Thus, their description will be omitted herein.

Referring to FIG. 8, a description will be given of another block diagram of the OLT, which described using FIGS. 2 and 4. Here, FIG. 8 is a functional block diagram of the OLT. In FIG. 8, a data interface 201 receives the signals from the IP network 6 and the TDM network 7. The signals are once stored in a downstream data buffer 202. Based on the PON downstream frame signal format described in ITU-T Recommendation G.984.3, a downstream PON frame generator 203 stores the signal from the downstream data buffer 202 into a GEM frame payload, and the signal from an upstream timeslot controller 214 into a granted field of the downstream PON frame. The downstream PON frame transmitted from the downstream PON frame generator is converted to a serial signal by a parallel/serial converter 204. The serial signal is converted from the electrical signal to an optical signal by E/O 205. The converted optical signal is transmitted to the trunk fiber 8 through a WDM filter 207.

The upstream signal from the trunk fiber 8 is wavelength-division demultiplexed by the WDM filter 207. The wavelength-division demultiplexed upstream signal is converted from the optical signal to the electrical signal by O/E 208. The converted electrical signal is identified with respect to the value 0 or 1 by an Automatic Threshold Control (ATC: identification unit) 209 using an appropriate threshold. A clock extraction unit 210 performs clock extraction and retiming, from the identified signal. Further, a serial/parallel converter 211 detects the delimiter field of the PON upstream frame signal format that is described in ITU-T Recommendation G.984.3, identifies the segments of the upstream signal, and converts the serial signal to parallel signals. An upstream PON frame terminator 212 identifies a user signal and a control signal included in the upstream frame, and outputs the user signal to an upstream data buffer 213.

An upstream timeslot controller 214 extracts notification information (queue information), which is one of the control signals and indicates the transmission data accumulation states of the ONUs, from the upstream PON frame terminator 212. The upstream timeslot controller 214 calculates the upstream timeslot to be assigned to each ONU, based on the bandwidth control information specified in advance by an administrator as well as on the notified queue information. The upstream timeslot controller 214 periodically updates the content of an upstream bandwidth management table 215. Further, based on the managed upstream timeslot information, the upstream timeslot controller 214 determines the boundary of the upstream burst signal from each ONU, and notifies the ATC 209 of a reset signal 216. Still further, based on the managed upstream timeslot information, the upstream timeslot controller 214 determines the ranging window field, and notifies the ACT 209 of an offset switching signal 217 for discriminating the ranging window field and the other timeslot field.

The user signal output from the upstream PON frame terminator 212 is once stored in an upstream data buffer 213, and is transmitted to the IP network 6 or the TDM network 7 through the data interface 201.

The configuration of the OLT optical signal reception part will be described with reference to FIG. 9. Here, FIG. 9 is a hardware block diagram of the O/E and the ATC that constitute the OLT optical signal reception part. In FIG. 9, O/E 208 includes an Avalanche Photo Diode (APD) 220 connected to a high-voltage bias source 221, and a Trans-Impedance Amplifier (TIA) 222.

The APD 220 is reverse biased by a high voltage, in which the received optical signal is amplified by an avalanche effect and is converted to an electrical current. Because of this amplification operation, it is possible to correctly identify the data when a high-speed optical signal of over 1 Gbits/s input as a weak signal of about −30 dBm. The converted electrical current is converted to voltage by the TIA 222 that includes a resistance 223 and an amplifier 224.

In the ATC 209, the received signal voltage is identified by a threshold set to a value obtained by adding the offset 218 to a value 229 which is half the amplitude. As a result, a signal identified as "0" or "1" is output. The output of an amplifier 225 is input to a transistor 227-1 in which the peak value is detected using a diode function thereof from a base to an emitter. Then, the output is stored in a capacitor 228 and is given as a value 229. The reset signal 216 is given to a transistor 227-2 just before the reception of the signal from each ONU. Then, the value 229 stored in the capacitor 228 is discharged and is reset to "0" level.

The configuration of the ATC will be described further in detail with reference to FIGS. 10 and 11. Here, FIGS. 10 and 11 are block diagrams of the ATC and peripheral circuits.

Figure 10:
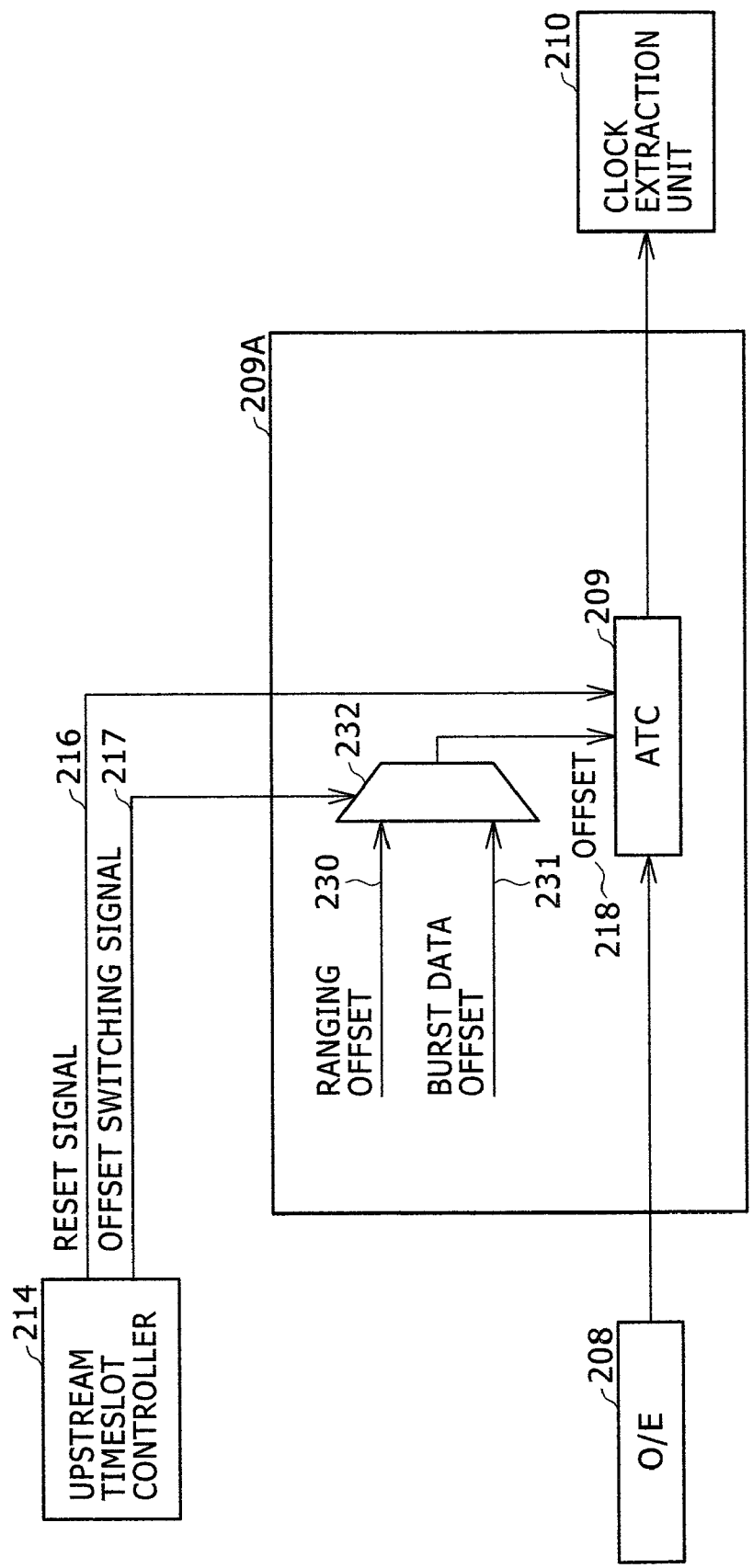
FIG. 10 is a block diagram of the ATC and peripheral circuits (part 1)

In FIG. 10, ATC 209A includes the ATC 209 and a selector 232. The O/E 208 inputs the voltage-converted received signal into the ATC 209. The upstream timeslot controller 214 inputs an offset switching signal 217 into the ATC 209A, in addition to the reset signal 216 for the ranging window. In response to the offset switching signal 217, the selector 232 selects a ranging offset 230. At this time, the offset 218 input to the ATC 209 has the same value as the ranging offset 230. With respect to the timeslot other than the ranging window, the upstream timeslot controller 214 inputs the offset switching signal 217 into the ATC 209A, in addition to the reset signal 216 for the timeslot other than the ranging window. In response to the offset switching signal 217, the selector 232 selects a bust data offset 231. The offset 218 input to the ATC 209 has the same value as the bust data offset 231. The ATC 209A identifies the received data by the selected offset, and transmits to the clock extraction unit 210.

Figure 11:
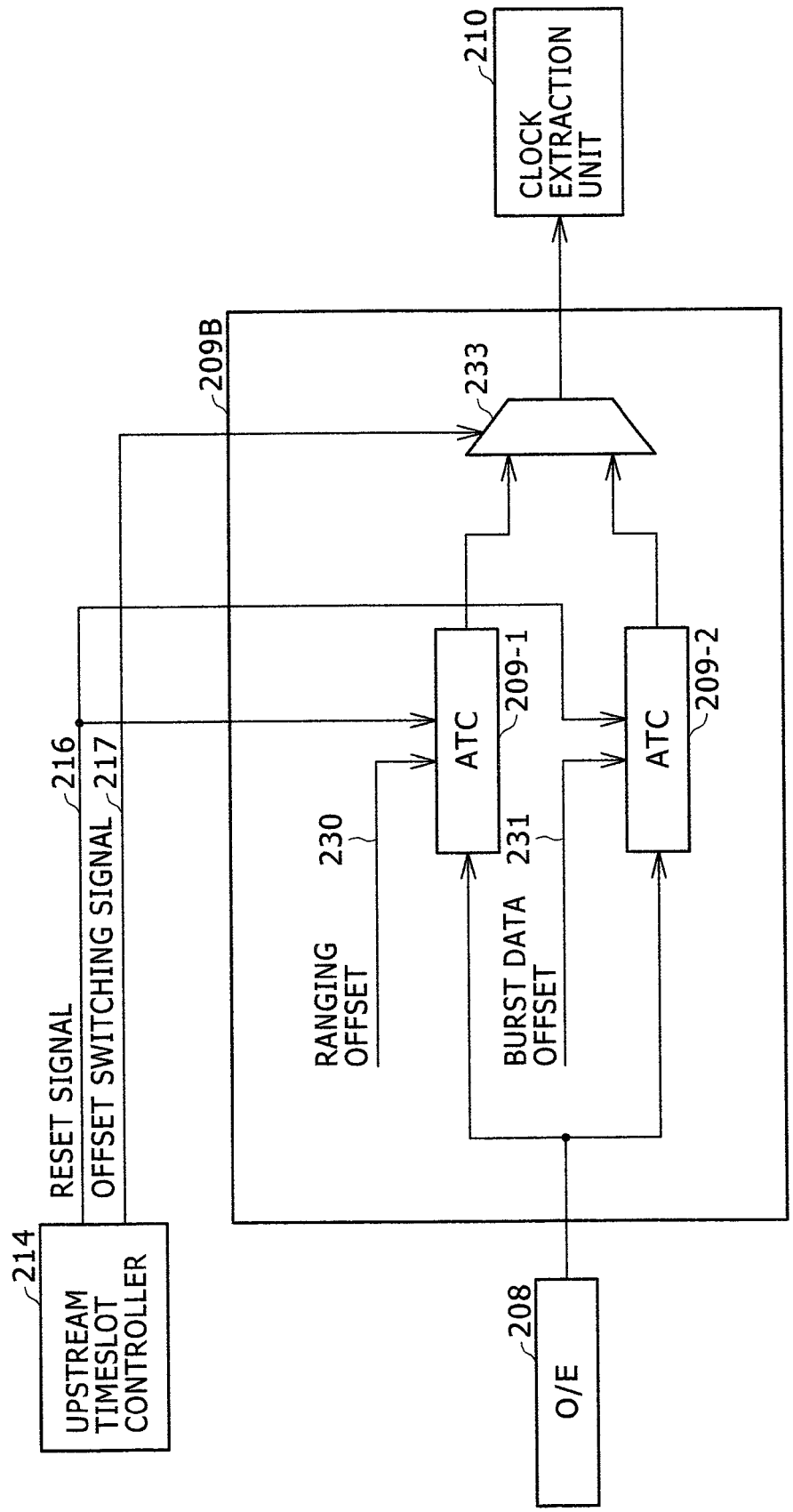
FIG. 11 is a block diagram of the ATC and peripheral circuits (part 2)

In FIG. 11, ATC 209B includes two ATCs 209 and a selector 233. The ATC 209-1 has an input fixed to the ranging offset 230. The ATC 209-2 has an input fixed to the burst data offset 231. The O/E 208 inputs the voltage-converted received signal into the two ATCs 209. In response to the offset switching signal from the upstream timeslot controller 214, the selector 233 selects the output signal of the ATC 290-1 for the timeslot of the ringing window, while selecting the output signal of the ATC 209-2 for the timeslot other than the ranging window. The selected output signal is transmitted to the clock extraction unit 210.

Figure 12:
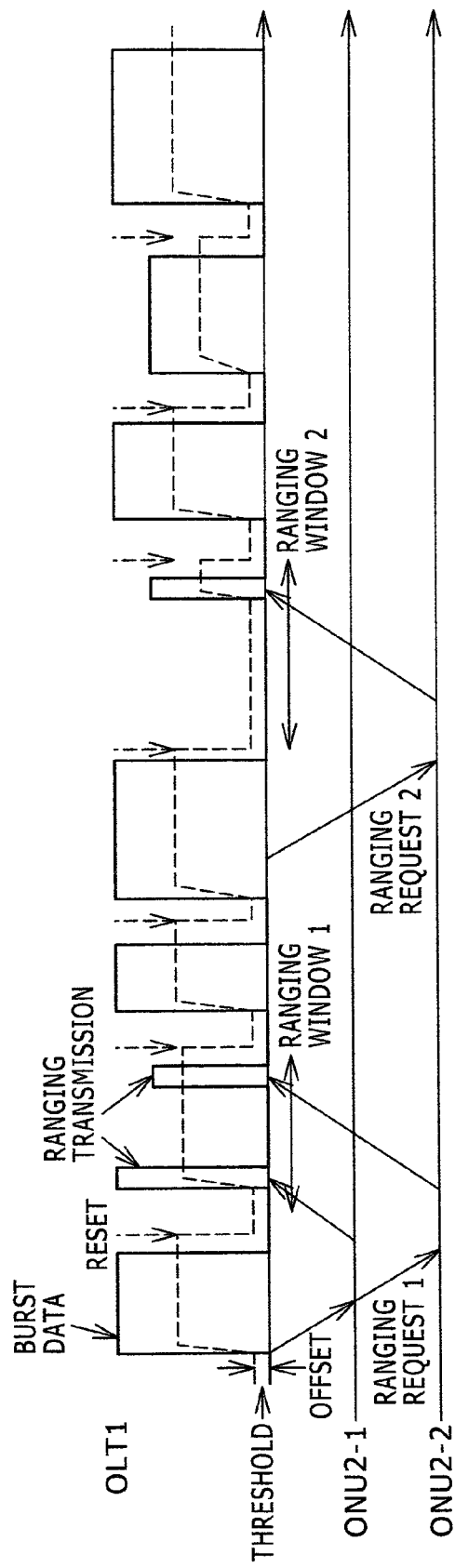
FIG. 12 is a diagram illustrating the reception of upstream burst signals and ranging transmissions with a constant offset.
Figure 13:
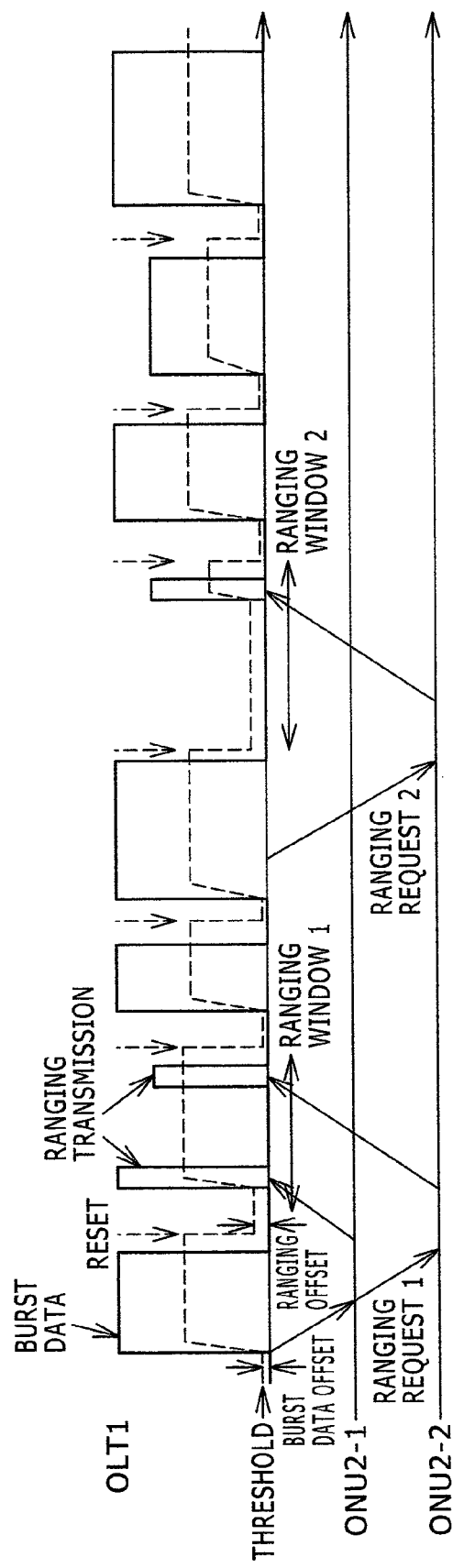
FIG. 13 is a diagram illustrating the reception of upstream signals and ranging transmissions with different offsets.

Referring to FIGS. 12 and 13, a description will be given of the reception of upstream burst signals and ranging transmissions. Here, FIG. 12 is a diagram illustrating the reception of upstream burst signals and ranging transmissions with a constant offset. FIG. 13 is a diagram illustrating the reception of upstream burst signals and ranging transmissions with different offsets.

In FIG. 12, the horizontal axis represents the time axis. The vertical axis corresponding to the OLT 1 represents the reception level and the threshold. The vertical axis from the reception level original point of the OLT 1 to the ONUs 2-1 and 2-2 represents the distance. More specifically, the distance between the OLT 1 and the ONU 2-1 is 10 km, and the distance between the OLT 1 and the ONU 2-2 is 20 km. The offset for the burst data and the offset for the ranging transmission within the ranging window are the same value. The threshold for the burst data and for the ranging transmission is determined to be "1" or "0" based on a value higher than the half of the burst data amplitude by the amount of the offset.

FIG. 12 shows a state in which the ONUs 2-1, 2-2 are newly added to the optical access network 10. More specifically, when the OLT 1 transmits a ranging request 1, the ONUs 2-1 and 2-2 transmit ranging transmissions to the OLT 1, respectively. At this time, a ranging window 1 is open, and the OLT 1 processes the first received ranging transmission of the ONU 2-1. Next, when the OLT 1 transmits a ranging request 2, the ONU 2-2 transmits a ranging transmission to the OLT 1. At this time, a ranging window 2 is open, and the OLT 1 processes the first received ranging transmission of the ONU 2-2. Incidentally, the downward arrows in the figure represent the reset signals that the upstream timeslot controller 214 transmits to the ATC 218 by determining the boundary of the burst signal as well as the end of the ranging window.

In FIG. 13, the offset for the burst data is the bust data offset value, and the offset for the ranging transmission is the ranging offset value. The ranging offset value is set to the same value as the offset of FIG. 12, and the burst data offset value is set to be lower than the offset of FIG. 12. As a result, the threshold for the burst data is closer to the half of the amplitude, than the threshold of FIG. 12.

As described above, the burst data offset value can be made smaller than the ranging offset value, because the OLT 1 can predict from which ONU 2 the burst data is received, according to the timing in the signal waiting window (burst data waiting window). Further, even if the delimiter detection is failed, the data can be discarded by the later stage logic. On the other hand, in the ranging window used for the ranging to measure distances, the OLT 1 cannot predict the timing at which the ranging transmission is received. When the off set is reduced in the ranging window, the white noise may be misidentified as the normal ranging transmission. In order to prevent such a misidentification, it is necessary to maintain the offset value equal to half the difference between the reception level from the farthest ONU, and the white noise. The ranging can be performed repeatedly.

Figure 14A:
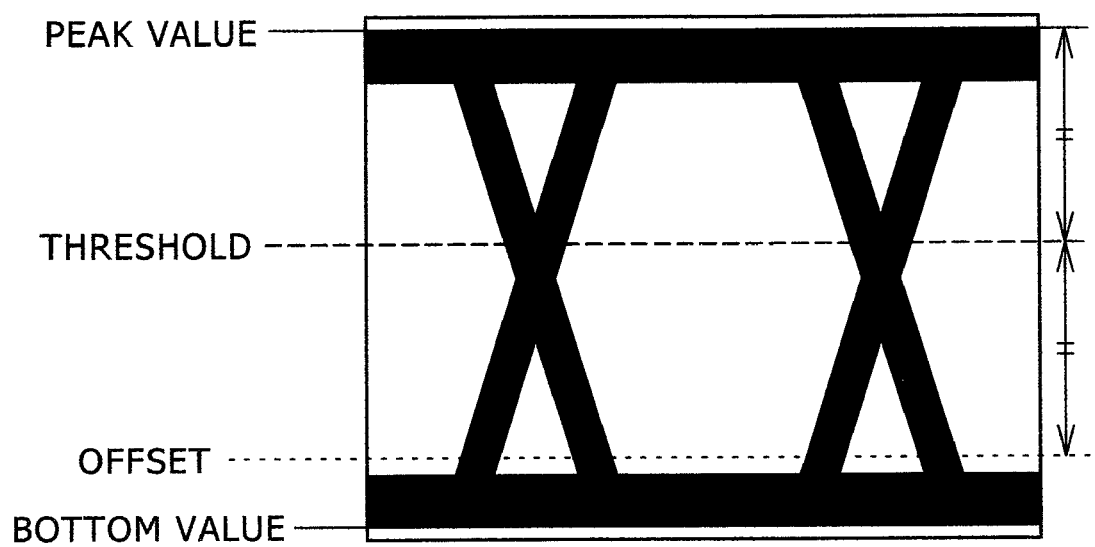
FIGS. 14A and 14B are diagrams each illustrating the peak value, bottom value, threshold, and offset of a received bust signal with a high offset.
Figure 14B:
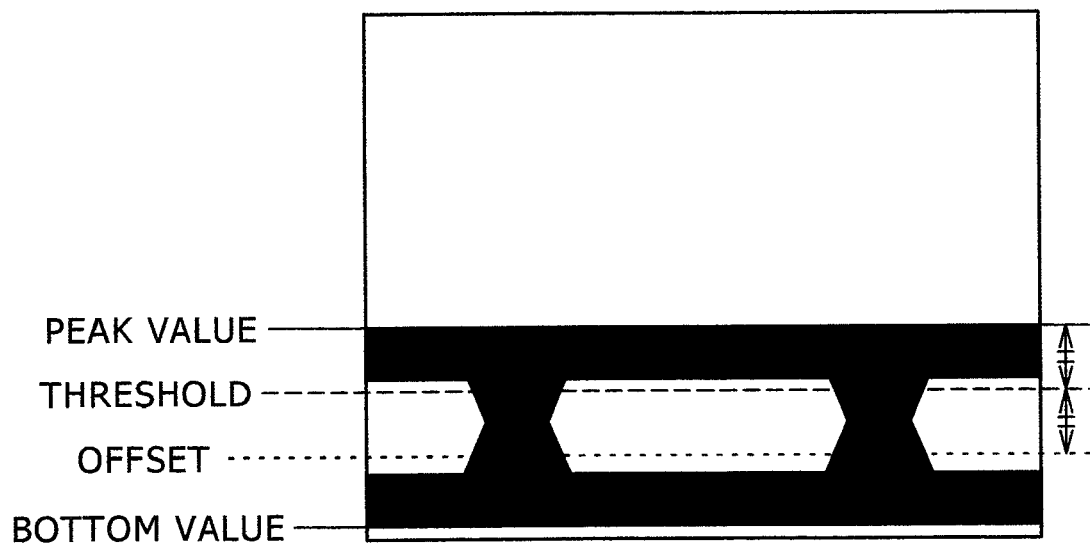
Figure 15A:
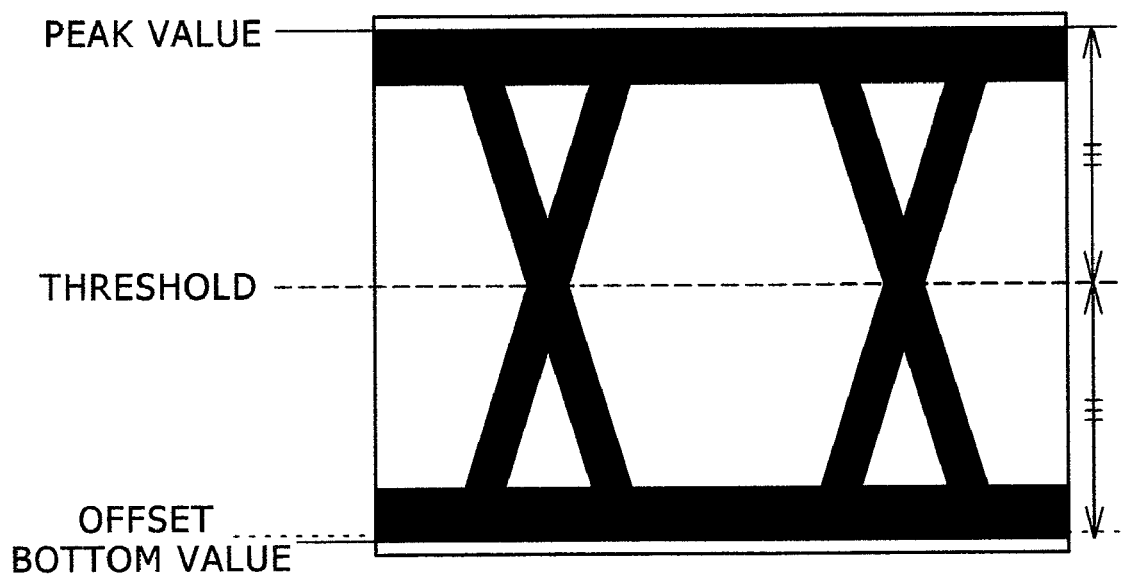
FIGS. 15A and 15B are diagrams each illustrating the peak value, bottom value, threshold, and offset of a received bust signal with a low offset.
Figure 15B:
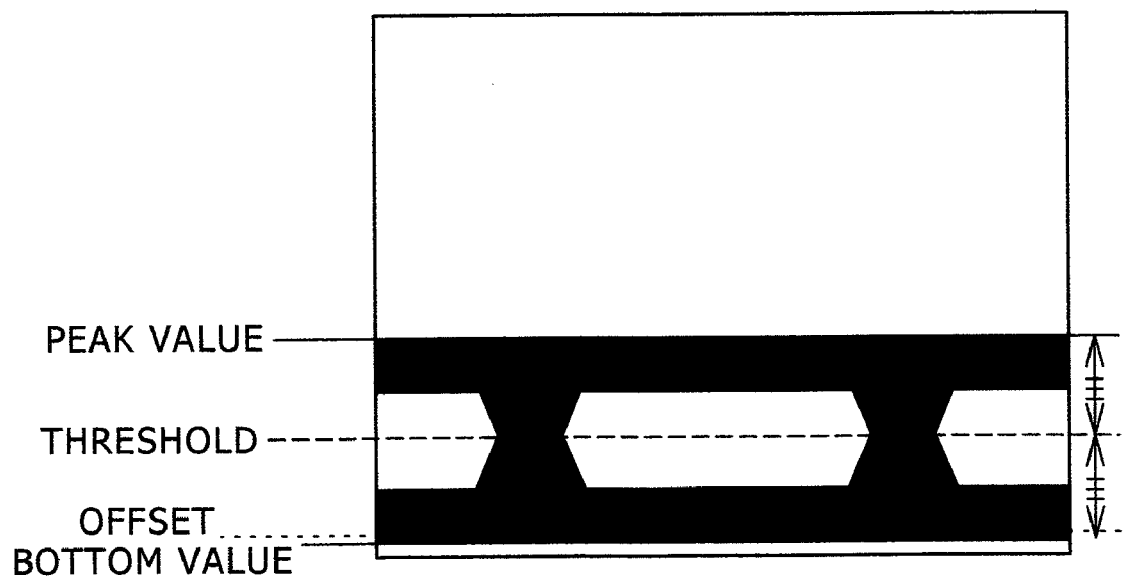

Referring to FIGS. 14A, 14B and FIGS. 15A, 15B, a description will be given of the peak value, bottom value, threshold, and offset of the burst reception signal. Here, FIGS. 14A, 14B are diagrams illustrating the peak value, bottom value, threshold, and offset of the burst reception signal with a high offset. FIGS. 15A and 15B are diagrams illustrating the peak value, bottom value, threshold, and offset of the burst reception signal with a low offset.

FIG. 14A shows the case in which the received optical power is large (the ONU-OLT distance is short). FIG. 14B shows the case in which the received optical power is small (the ONU-OLT distance is long). Here, the offset is the same offset value of FIG. 12, and the threshold is equal to half the sum of the peak value and the offset value. As apparent from FIG. 14B, when the received optical power is small, the threshold is close to the peak value, so that the probability of misidentifying "1" as "0" is high.

FIG. 15A shows the case in which the received optical power is large. FIG. 15B shows the case in which the received optical power is small. Here, the offset is the same offset value of FIG. 13, and the threshold is equal to half the sum of the peak value and the offset value. In FIG. 15B, the threshold is in the middle of the eye pattern even when the received optical power is small, so that the probability of misidentification is low.

Figure 16:
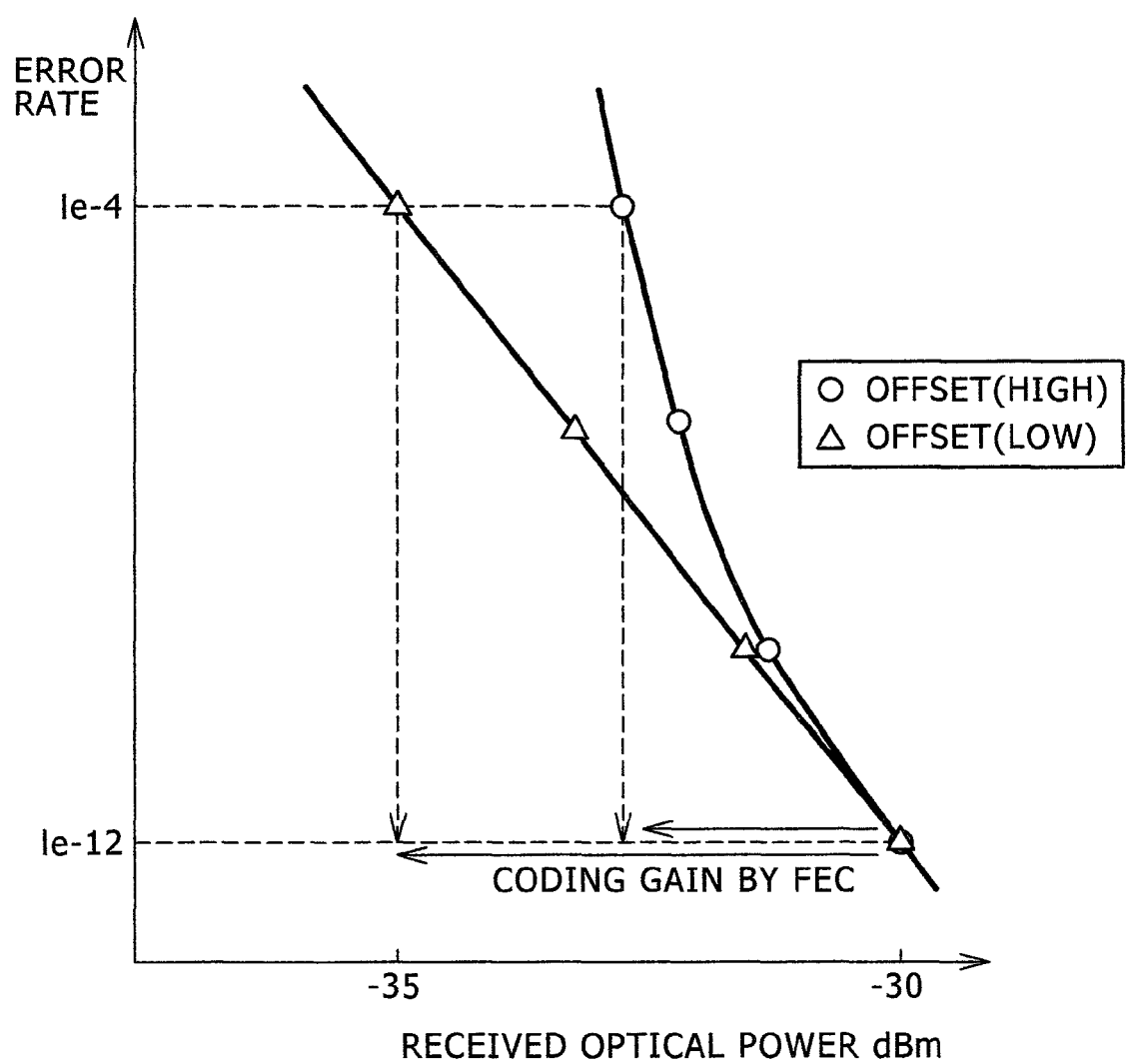
FIG. 16 is a diagram illustrating the relationship between the error rate and the received optical power, with the amount of offset given as the parameter.

The burst reception characteristics will be described with reference to FIG. 16. Here, FIG. 16 is a diagram showing the relationship between the received optical power and the error rate, with the amount of offset given as the parameter. In FIG. 16, the vertical axis represents the signal error rate, and the horizontal axis represents the received optical power. When the received optical power is about −30 dBm, an error rate of 1e-12 ($1\times10^{-12}$) can be obtained independent of the amount of the offset. However, the error rate increases as the received optical power decreases. When the offset is high, the increase rate is significant and the inclination of the PON bust reception characteristics is steep. The application of FEC can correct an error rate of 1e-4 to the equivalent of 1e-12. Coding gain is the difference between the received optical power providing the error rate 1e-4 that can be corrected, and the received optical power providing the error rate 1e-12 without error correction. The coding gain is 2.5 dBm when the offset for the burst data is the same as for the ranging window, whereas the coding gain is achieved to be 5 dBm when the offset for the burst data is reduced.

As described above, according to the embodiment, it is possible to moderate the inclination of the PON burst reception characteristics and to improve the FEC effects. As a result, it is possible to provide a PON system and an optical line terminal that have excellent characteristics.

What is claimed is:

1. An optical line terminal comprising:
an OE converter;
an identification unit for identifying the output of the OE converter with respect to the value 0 or 1 using a threshold; and
a controller for controlling the identification unit,
wherein said controller provides the identification unit with a first offset in the period of receiving a ranging transmission and provides the identification unit with a second offset which is smaller than the first offset, a period other than the period of receiving the ranging transmission,
wherein said identification unit calculates the threshold for identification, based on the first offset or the second offset which is provided by the controller.

2. The optical line terminal according to claim 1, further comprising a selector for selecting one of the first offset and the second offset and for outputting the one,
wherein said controller provides the identification unit with one of the first offset and the second offset by control of the selector.

3. An optical line terminal having an OE converter and first and second identification units which identify the output of the OE converter with respect to the value 0 or 1 using a threshold, comprising:
a selector for selecting one of the first and second identification units; and
a controller which control the selector so that the selector selects the first identification unit in the period of receiving a ranging transmission and selects the second identification unit in the period of other than the period of receiving a ranging transmission,
wherein said first identification unit uses a first threshold which is calculated based on a first offset,
wherein said second identification unit uses a second threshold which is calculated based on a second offset, and
wherein said second offset is smaller than the first offset.

* * * * *